(12) United States Patent
Teplitsky

(10) Patent No.: US 6,678,283 B1
(45) Date of Patent: Jan. 13, 2004

(54) SYSTEM AND METHOD FOR DISTRIBUTING PACKET PROCESSING IN AN INTERNETWORKING DEVICE

(75) Inventor: Yakov Teplitsky, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/265,130

(22) Filed: Mar. 10, 1999

(51) Int. Cl.$^7$ ................................. H04L 12/66
(52) U.S. Cl. ......................... 370/463; 713/201
(58) Field of Search ..................... 370/463, 254, 370/395.31, 395.5, 395.52, 395.53, 903, 901, 908, 469, 401; 713/201, 208; 709/224

(56) References Cited

U.S. PATENT DOCUMENTS

| | | | |
|---|---|---|---|
| 5,802,278 A | | 9/1998 | Isfeld et al. |
| 6,067,569 A | * | 5/2000 | Khaki et al. ................. 709/224 |
| 6,122,670 A | * | 9/2000 | Bennett et al. ............. 709/236 |
| 6,131,163 A | * | 10/2000 | Wiegel ........................ 709/201 |
| 6,477,670 B1 | * | 11/2002 | Ahmadvand ................ 714/712 |
| 6,512,774 B1 | * | 1/2003 | Vepa et al. .................. 370/401 |

FOREIGN PATENT DOCUMENTS

| EP | 0 530 394 A1 | 3/1993 |
|---|---|---|
| WO | WO 99/00945 | 1/1999 |

* cited by examiner

Primary Examiner—Chi Pham
Assistant Examiner—Alexander O. Boakye

(57) ABSTRACT

An internetworking device having a set of network interface cards, where each network interface card is able to address and send data to any of the other network interface cards. According to one embodiment, when one of the network interface cards receives a network layer packet that should be forwarded to another one of the network interface cards, a process running on the network interface card that received the network layer packet determines a destination address of the network layer packet and determines whether the destination address matches a network layer address of the internetworking device. If the destination address does not match a network layer address of the internetworking device, the process further determines, based on the destination address of the network layer packet, the network interface card to which the network layer packet should be forwarded. Otherwise the process examines a destination port field within a transport layer packet encapsulated by the network layer packet to determine a destination port number and determines, based at least in part on the destination port number, the network interface card to which the network layer packet should be forwarded. In this manner, transport layer processing does not have to be centralized within the internetworking device. Instead, the present invention allows each network interface card to have a transport layer process, wherein each transport layer process has the same network layer addresses.

30 Claims, 10 Drawing Sheets

SYSTEM AND METHOD FOR DISTRIBUTING PACKET PROCESSING IN AN INTERNETWORKING DEVICE

BACKGROUND OF THE INVENTION

1. Field of the Invention

The present invention relates generally to the field of computer networking, and more specifically, to internetworking devices.

2. Related Art

An internetworking device is a device that facilitates communication between computers. In one example, an internetworking device is a device that connects two or more networks to form a larger network, called an internet. An example of such a device is a router. Another example of such a device is a bridge. An internetworking device may also enable a remote computer to communicate with another computer (usually a server) through a dial-up or integrated services digital network (ISDN) connection. Such an internetworking device is said to provide remote access services. By definition, an internetworking device has two or more input/output (I/O) interfaces, also referred to as network interfaces.

Conventionally, an internetworking device is configured with one or more network interface cards (NICs) for connecting the internetworking device to one or more networks and/or hosts. A conventional internetworking device is also configured with a manager card for, among other things, managing the internetworking device.

When a NIC of a conventional internetworking device receives a network layer packet, such as in internet protocol (IP) packet, that is addressed to the internetworking device, the NIC forwards the network layer packet to the manager card for processing. As the amount of data traffic increases in a network, so may the number of network layer packets that are forwarded to the manager card for processing. The conventional approach to handling this increased packet processing pressure on the manager card is to equip the manager card with faster microprocessors and with additional memory chips. However, this approach to the problem is expensive. Furthermore, even with faster microprocessors, the manager card may not be able to process packets as quickly as it is receiving them, thus degrading the performance of the internetworking device.

What is needed, therefore, is an improved internetworking device that is able to effectively deal with the increase in packet processing demands.

SUMMARY OF THE INVENTION

The present invention provides an improved internetworking device. In one embodiment the present invention provides an internetworking device having a set of network interface cards, where each network interface card is able to address and send data directly to any of the other network interface cards. According to one embodiment, when one of the network interface cards receives a network layer packet, a process running on that network interface card determines a destination address of the network layer packet and determines whether the destination address matches a network layer address of the internetworking device. If the destination address does not match a network layer address of the internetworking device, the process further determines, based on the destination address of the network layer packet, the network interface card to which the network layer packet should be forwarded. Otherwise the process examines a destination port field within a transport layer packet encapsulated by the network layer packet to determine a destination port number. The process then determines, based at least in part on the destination port number, the network interface card to which the network layer packet should be forwarded. In this manner, transport layer processing does not have to be centralized within the internetworking device. Instead, the present invention allows each network interface card to have a transport layer process.

Advantageously, each network interface card further includes a memory for storing a network layer forwarding database and at least one transport layer forwarding database. Preferably, the memory stores a transport layer forwarding database for each transport layer protocol supported by the internetworking device. In one embodiment, when a network interface card receives a network layer packet and the destination address of the network layer packet matches a network layer address of the internetworking device, a process running on the network interface card utilizes one of the transport layer forwarding databases in determining the network interface card to which the network layer packet should be forwarded.

Preferably, each network interface card includes at least a first transport layer forwarding database and a second transport layer forwarding database, where each transport layer forwarding database includes one or more records. In one embodiment, each of the records of the first transport layer database has a port number field for storing a transmission control protocol (TCP) port number and a corresponding network interface card identifier field for storing a network interface card identifier. Similarly, each of the records of the second transport layer database has a port number field for storing a user datagram protocol (UDP) port number and a corresponding network interface card identifier field for storing a network interface card identifier.

The invention also provides a method for routing a network layer packet within an internetworking device having a set of network interface cards, where each of the network interface cards includes a network layer, a transport layer, and an application layer. When the network layer packet is received at one of the network interface cards, the method includes the following steps: (a) determining a destination address of the network layer packet; (b) if the destination address of the network layer packet does not match a network layer address of the internetworking device, then (1) determining, based on the destination address, the network interface card to which the network layer packet should be forwarded and (2) transmitting the network layer packet from the network interface card that received it to the network interface card to which the network layer packet should be forwarded; and (c) if the destination address of the network layer packet matches a network layer address of the internetworking device, then (1) determining a destination port number of a transport layer packet encapsulated by the network layer packet, (2) determining, based at least in part on the destination port number, the network interface card to which the network layer packet should be forwarded, and (3) transmitting the network layer packet from the network interface card that received it to the network interface card to which the network layer packet should be forwarded.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
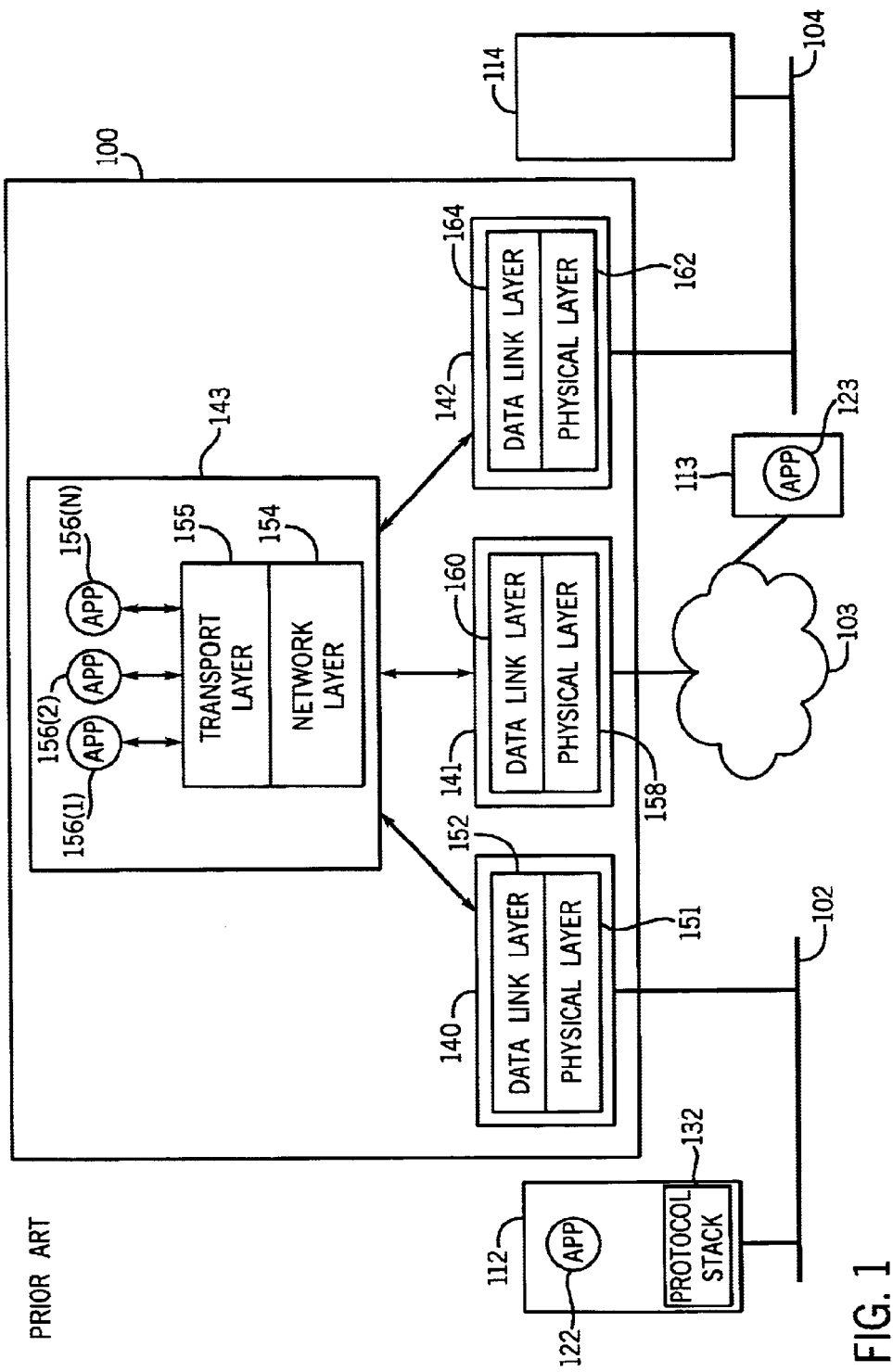
FIG. 1 illustrates a conventional internetworking device.

FIG. 1 illustrates a conventional internetworking device 100. Conventional internetworking device 100 includes three network interface cards 140–142 and a manager card 143. Conventionally, manager card 143 includes a network layer 154, a transport layer 155, and one or more application processes 156(1)–156(N). Further, conventional network interface cards 140–142 include a physical layer and a data link layer, but no other protocol layers. As shown in FIG. 1, network interface card 140 includes physical layer 151 and data link layer 152, network interface card 141 includes physical layer 158 and data link layer 160, and network interface card 142 includes physical layer 162 and data link layer 164.

Internetworking device 100 interconnects a first local area network (LAN) 102, a wide area network (WAN) 103, and a second LAN 104 to form an internet. By forming the internet, internetworking device 100 enables hosts 112–114 to communicate with each other. For example, host 112, which is directly connected to LAN 102, is able to communicate with host 113, which is connected to WAN 103, through conventional internetworking device 100. More specifically, device 100 enables an application process 122 running on host 112 to transfer data (or information) to an application process 123 running on host 113.

As an example, when application process 122 seeks to transmit data to application process 123, application process 122 passes the data to a protocol stack 132 running on host 112. Protocol stack 132 is a process or a group of processes that perform protocol processing. Protocol stack 132 is responsible for, among other things, placing the data onto LAN 102, where it is then received by network interface card 140 of device 100. The data is then passed to manager card 143, which then routes the data to network interface card 141, where it is transmitted through WAN 103 to host 113.

Figure 2:
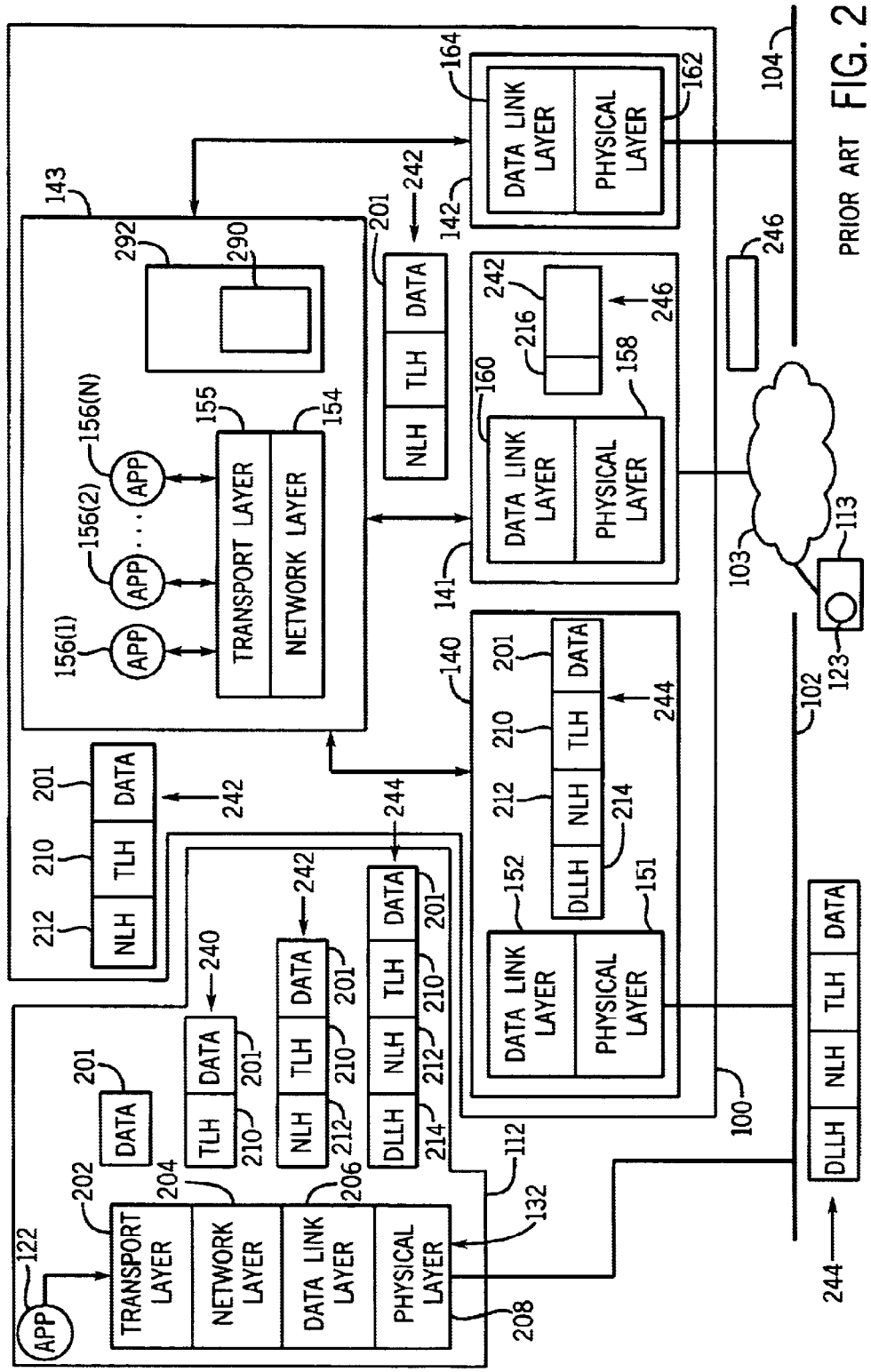
FIG. 2 illustrates the flow of data between application process 122 and example application process 123 shown in FIG. 1.

Conventionally, protocol stack 132 is divided into several layers. FIG. 2 further illustrates protocol stack 132. For illustrative purposes only, protocol stack 132 is shown as having a transport layer 202, a network layer 204, a data link layer 206, and a physical layer 208. However, one skilled in the art will recognize that additional protocol layers may be added to protocol stack 132.

FIG. 2 also illustrates the flow of data between example application process 122 and example application process 123. When application process 122 has data 201 to transmit to application process 123, application process 122 passes the data 201 to transport layer 202 of protocol stack 132. Transport layer 202 adds a transport layer header (TLH) 210 to the data 201, thereby forming a transport layer packet 240. Transport layer header 210 contains, among other fields, a destination port number field and a source port number field. In this example, the destination port number field contains a port number that is uniquely associated with application process 123 on host 113. The source destination port number field contains a port number that is associated with application process 122.

Transport layer packet 240 is passed from transport layer 202 to network layer 204. Network layer 204 adds a network layer header (NLH) 212 to transport layer packet 240, thereby forming a network layer packet 242. Network layer header 212 contains, among other fields, a destination address field and a source address field. In this example, because host 112 is the source of the data 201 and host 113 is the intended destination of the data 201, the destination address field contains a network layer address of host 113 and the source address field contains a network layer address of host 112. Thus, the destination address of network layer packet 242 is host 113.

Network layer packet 242 is passed from the network layer 204 to data link layer 206. Data link layer 206 adds a data link layer header (DLLH) 214 to network layer packet 242, thereby forming a data link layer packet 244 (also referred to as a frame or data link frame). Data link layer header 214 contains, among other fields, a physical destination address field. In this example, the physical destination address field contains the physical address of network interface card 140 of device 100. Data link layer packet 244 is then passed from data link layer 206 to physical layer 208. Physical layer 208 is responsible for transmitting data link layer packet 244 onto LAN 102, where it is then received by physical layer 151 on conventional network interface card 140 of device 100.

Physical layer 151 removes data link layer frames from LAN 102 and stores them in a buffer (not shown). Data link layer 152 examines each data link layer frame that is buffered by physical layer 151. If a data link layer frame is addressed to network interface card 140, then data link layer 152 process the data link layer frame and if there are no errors extracts the network layer packet from the frame. Otherwise, the data link layer frame is discarded. After extracting a network layer packet from a data link layer frame, data link layer 152 transfers the network layer packet to network layer 154 on manager card 143.

In this example, data link layer frame 244 is received and buffered by physical layer 151. Because data link layer frame 244 is addressed to network interface card 140, data link layer 152 extracts network layer packet 242 from data link layer frame 244. Data link layer 152 then forwards network layer packet 242 to network layer 154 on manager card 143.

Upon receiving network layer packet 242, network layer 154 examines the destination address field of network layer packet 242 and examines network packet forwarding database 290 to determine the network interface card to which network layer packet 242 should be forwarded. Because network layer packet 242 is addressed to host 113, network layer 154 forwards network layer packet 242 to data link layer 160 on network interface card 141. Data link layer 160 adds a data link layer header 216 to network layer packet 242 and passes the resulting data link layer packet 246 to a physical layer 158. Physical layer 158 transmits data link layer frame 246 onto WAN 103. Network layer packet 242 is then routed through WAN 103 and ultimately received at host 113.

In this manner, conventional device 100 enables one application running on a particular host to transmit data to other applications that may or may not be running on hosts that are connected to the same LAN or WAN as the particular host.

The problem with device 100 is that all transport and network layer processing occurs on the manager card. This "centralized" architecture severely limits the performance of device 100. That is, the manager card becomes a bottleneck, thereby reducing the packet throughput of device 100.

Figure 3:
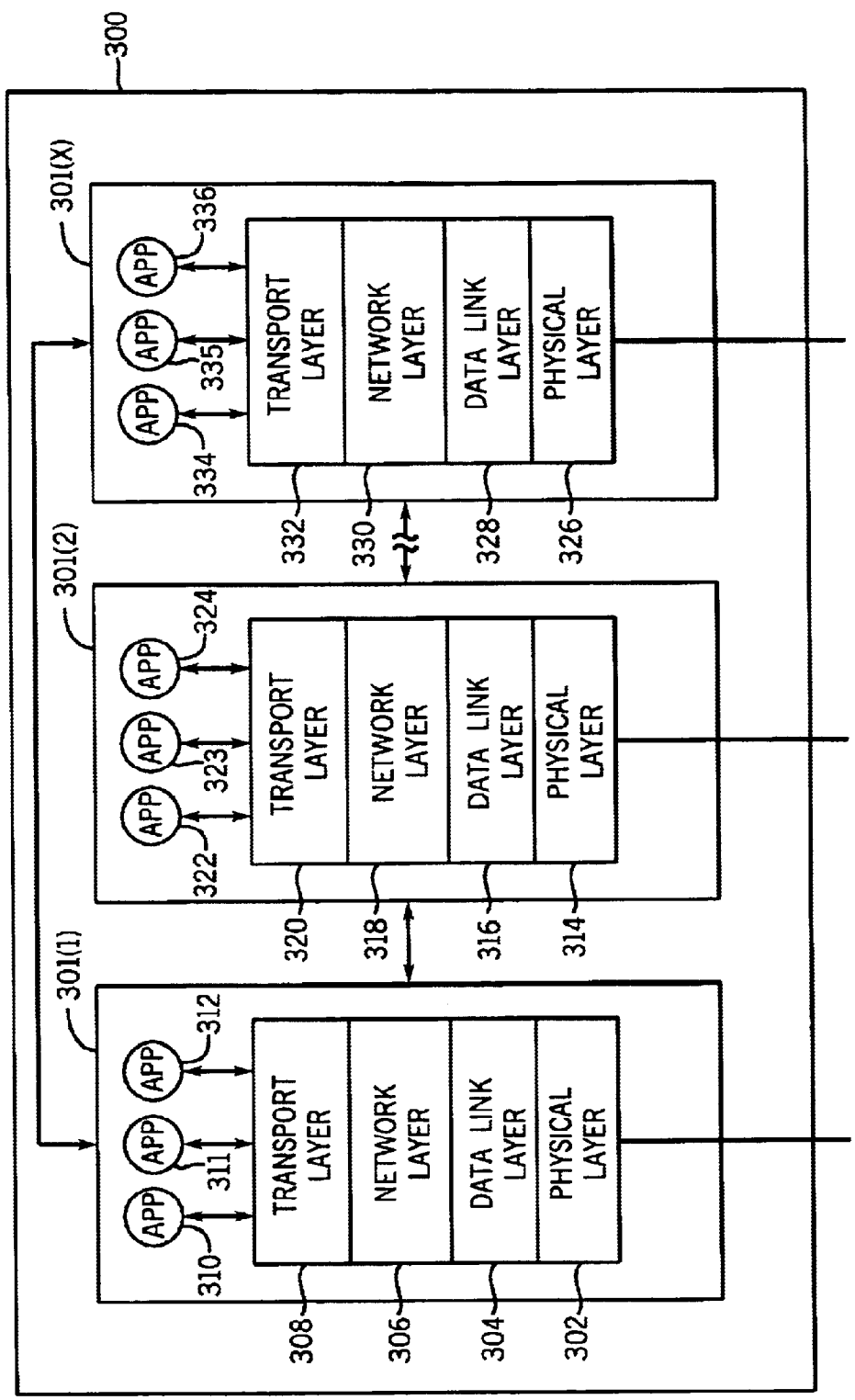
FIG. 3 illustrates an internetworking device according to one embodiment.

FIG. 3 illustrates an internetworking device 300 according to one embodiment of the present invention. Internetworking device 300 has a greater packet throughput than conventional device 100. Internetworking device 300 leverages a "distributed" architecture as opposed to the "centralized" architecture of conventional device 100.

Internetworking device 300, according to one embodiment, includes two or more network interface cards 301(1)–301(X). In one embodiment, each of these network interface cards 301(1)–301(X) may include not only a physical layer and a data link layer, but also a network layer, a transport layer, and one or more application processes. For example, as illustrated in FIG. 3, network interface card 301(1) includes a physical layer 302, a data link layer 304, a network layer 306, a transport layer 308, and one or more application processes 310–312. Similarly, network interface card 301(2) includes a physical layer 314, a data link layer 316, a network layer 318, a transport layer 320, and one or more application processes 322–324. And network interface card 301(X) includes a physical layer 326, a data link layer 328, a network layer 330, a transport layer 332, and one or more application processes 334–336.

Because each network interface card 301(1)–301(X) includes a network layer, a transport layer, and application processes, network, transport, and application layer processing is not centralized on one card like it is in conventional device 100. In contrast, network, transport, and application layer processing is distributed within internetworking device 300. This distributed processing scheme provides internetworking device 300 with a performance advantage over conventional device 100.

The distributed processing scheme, however, introduces administrative problems that are not present in conventional device 100. For example, because internetworking device 300 includes multiple transport layers that share the same network layer address, internetworking device 300 can not rely on the network layer address of a network packet to route the network packet to the correct network interface card. For example, assume network interface card 301(1) receives a data link layer frame that encapsulates a network packet, wherein the network destination address field of the network layer packet contains one of the network addresses of internetworking device 300. In this case, the application data within the packet may be destined for application process 322 on network interface card 301(2) or for application process 334 on network interface card 301(X). Consequently, the present invention provides a mechanism for routing packets within an internetworking device that has a distributed processing architecture.

Figure 4:
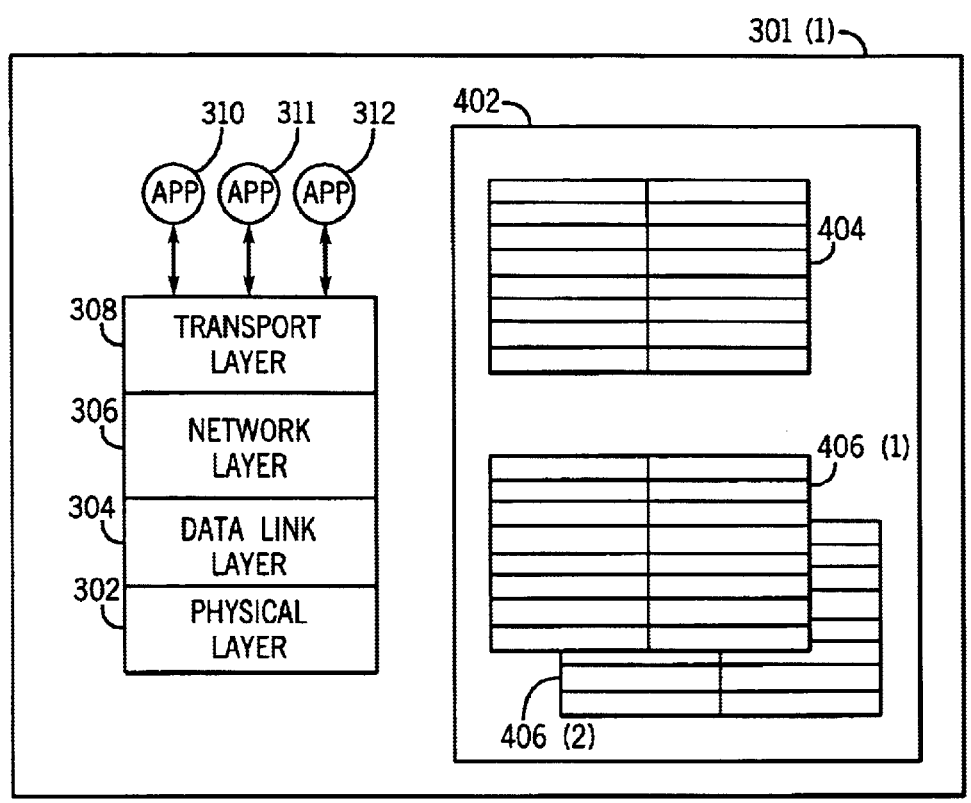
FIG. 4 illustrates a network interface card according to one embodiment.

In one embodiment, each network interface card of internetworking device 300 includes forwarding databases for forwarding packets to the correct destination. This is illustrated in FIG. 4, which further depicts network interface card 301(1). According to one embodiment, network interface card 301(1) is provided with a memory 402 for storing a network layer packet forwarding database (NLPFD) 404 and at least one transport layer packet forwarding database (TLPFD). Preferably, there is a TLPFD for each transport layer protocol supported by internetworking device 300. In one embodiment, internetworking device 300 supports two transport layer protocols: the transmission control protocol (TCP) and the user datagram protocol (UDP). Consequently, network interface card 301(1) includes a TCP-TLPFD (hereafter TCP port database) 406(1) and a UDP-TLPFD (hereafter UDP port database) 406(2). NLPFD 404 maps network layer addresses to one of the network interface cards 301(1)–(X) within internetworking device 300. Similarly, TLPFD 406(1) and 406(2) maps destination port numbers to one of the network interface cards 301(1)–(X) within internetworking device 300.

Figure 5:
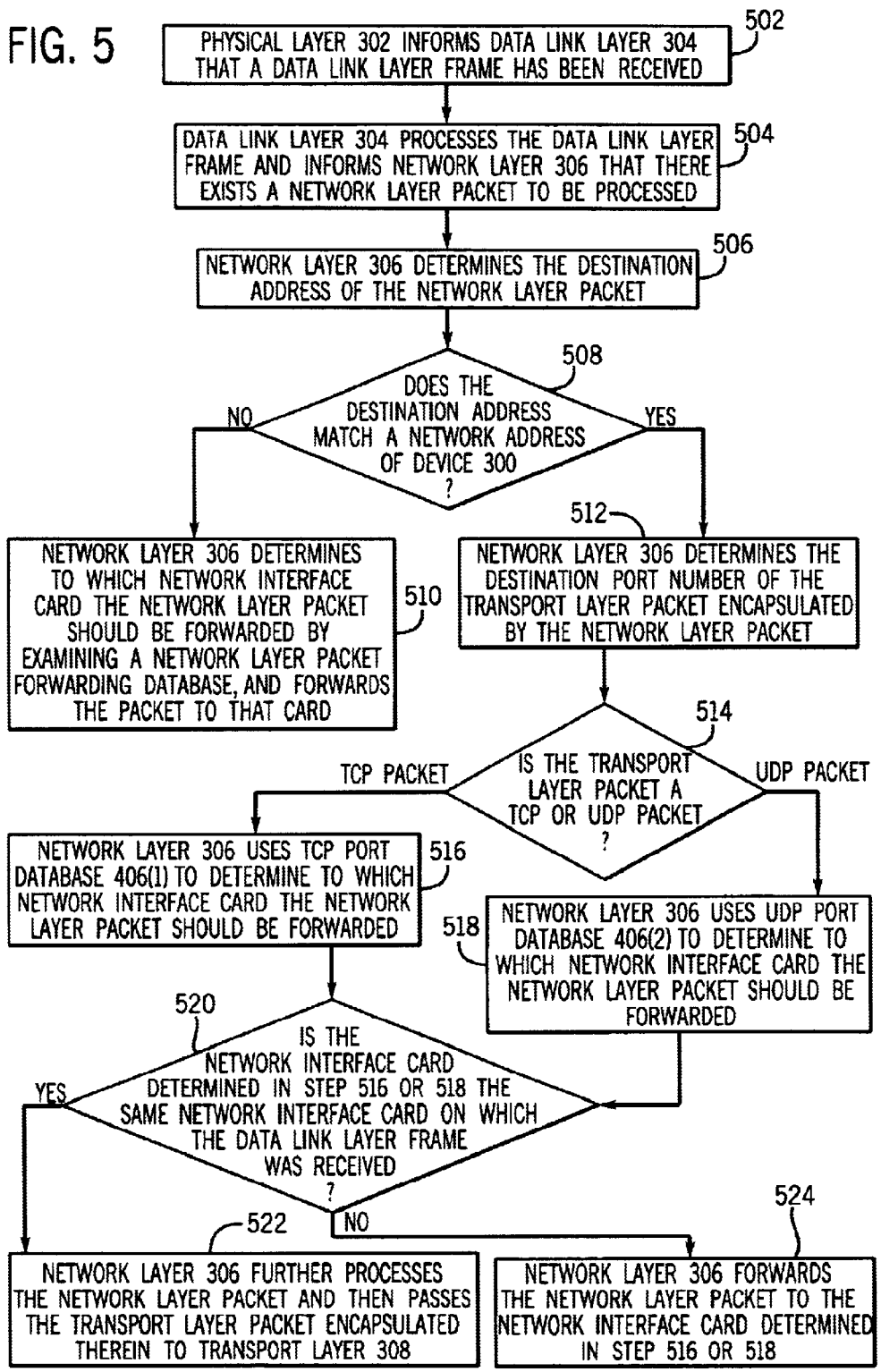
FIG. 5 illustrates a process performed by a network interface card according to one embodiment.

FIG. 5 illustrates a process 500 performed by network interface card 301(1) when a data link layer frame is received by physical layer 302, wherein the data link layer frame encapsulates a network layer packet, which encapsulates a transport layer packet, which encapsulates application data. Process 500 assumes that only the TCP and UDP transport layer protocols are supported. One skilled in the art would readily be able to modify process 500 to support other transport layer protocols in addition to TCP and UDP.

Process 500 begins in step 502, where physical layer 302 informs data link layer 304 that a data link frame has been received. After performing data link processing on the received data link layer frame, data link layer 304 informs network layer 306 that there is a network layer packet that needs to be processed (step 504).

Network layer 306 determines the destination address of the network layer packet by examining the contents of the destination address field of the packet (step 506). Next, network layer 306 determines whether the destination address matches a network layer address of internetworking device 300 (step 508). If the destination address does not match a network layer address of internetworking device 300, network layer 306 examines network layer forwarding database 404 to determine the network interface card to which the network layer packet should be forwarded and forwards the packet to that card (step 510).

If the destination address matches a network layer address of internetworking device 300, network layer 306 determines the destination port number of the transport layer packet encapsulated by the network layer packet by examining a destination port number field within the transport layer packet (step 512). Next, network layer 306 determines whether the transport layer packet encapsulated by the network layer packet is a TCP packet or a UDP packet by examining a protocol field within the network layer packet (step 514). If the transport layer packet is a TCP packet, network layer 306 uses TCP port database 406(1) to map the destination port number to a network interface card (step 516). Otherwise, network layer 306 uses UDP port database 406(2) to map the destination port number to a network interface card (step 518). Next, network layer 306 determines whether the network interface card that is mapped to the destination port number is the same network interface card on which the packet was received (step 520). If the network interface card that is mapped to the destination port number is the same network interface card on which the packet was received, network layer 306 further processes the network layer packet and then passes the transport layer packet contained therein to transport layer 308 (step 522). Otherwise, network layer 306 forwards the network layer packet to the network interface card associated with the destination port number (step 524). In this manner, internetworking device 300 supports distributed network, transport, and application layer processing.

NLPFD 404 and TLPFD 406(1) and 406(2) can be dynamically and manually updated. For example, assuming application process 310 seeks to communicate with a remote host using the TCP protocol, application process 310 requests a TCP source port number from transport layer 308. Transport layer 308 provides application process 310 with an unused port number. This unused port number is uniquely associated with application process 310. That is, the port number provided to application process 310 cannot be used by any other process within internetworking device 300. Network interface card 301(1) informs the other network interface cards 301(1)–(X) of the TCP port number that was provided to application process 310 so that those cards can each update their TCP port database to indicate that the port number provided to application process 310 is mapped to network interface card 301(1).

Figure 6:
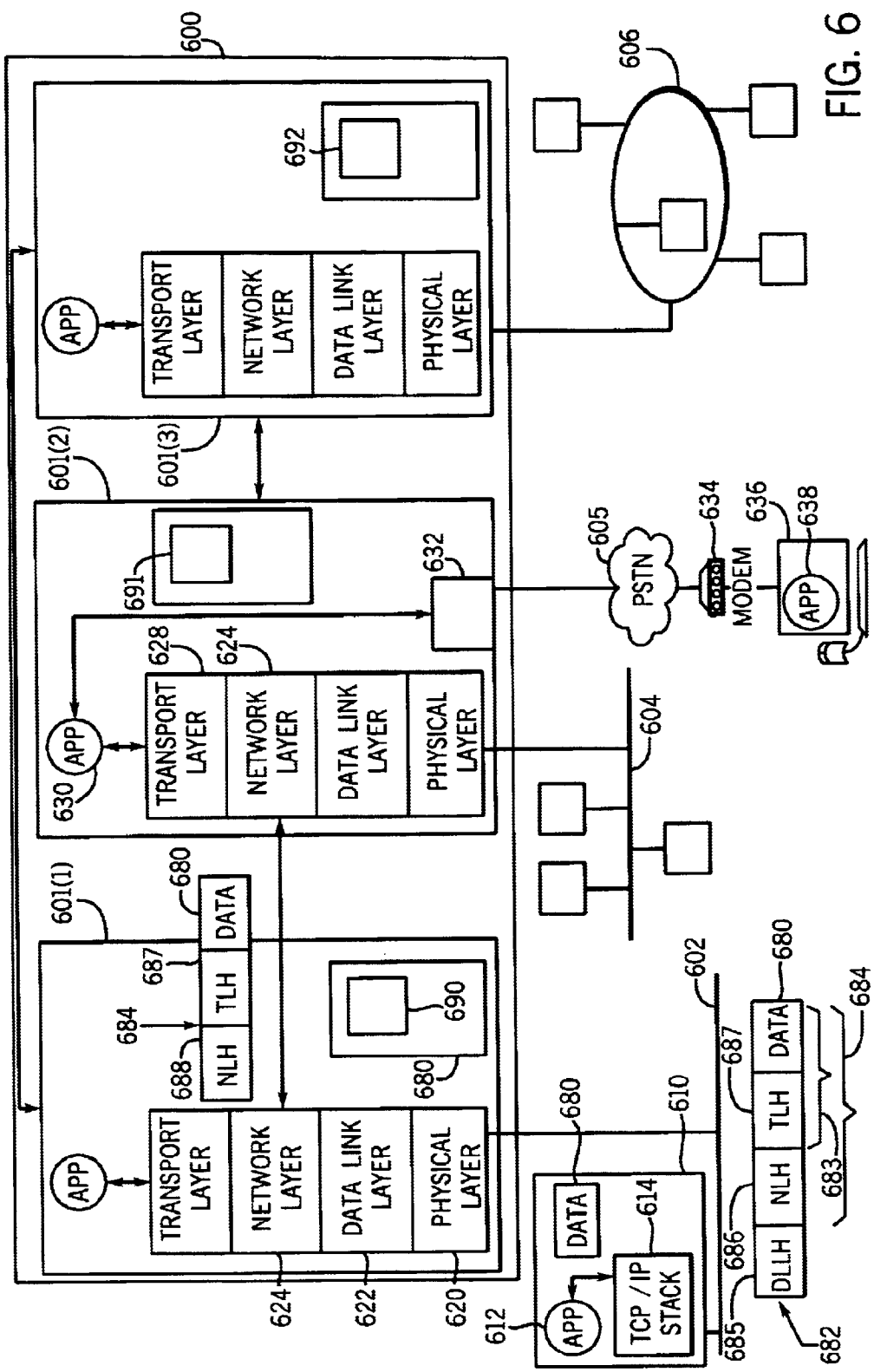
FIG. 6 illustrates an example application of an internetworking device according to one embodiment.

FIG. 6 illustrates an example application of an internetworking device 600 according to one embodiment. As illustrated in FIG. 6, internetworking device 600 is configured with three network interface cards 601(1)–(3). However, one skilled in the art will recognize that internetworking device 600 is not limited to any particular number of network interface cards.

In the example shown in FIG. 6, application process 638 on remote computer terminal 636 is provided with network access to networks 602, 604 and 606 through internetworking device 600. More particularly, internetworking device 600 enables application process 638 to communicate with application processes running on hosts connected to network 602, network 604, or network 606. Application 638 communicates with such application processes by first connecting to application 630 on network interface card 601(2). As an example, application process 638 can connect to application 630 through modems 632 and 634 and the public switched telephone network (PSTN) 605.

Once connected to application 630, application process 638 can direct application process 630 to connect to a host that is on a network that internetworking device 600 has access to, such as, but not limited to, network 602 604, and 606. For example, application process 638 can direct application process 630 to form a TCP connection with application process 612, which runs on host 610. Application process 630 forms a TCP connection with application process 612 by issuing a TCP connect request to transport layer 628. The TCP connect request includes the network layer address of host 610 and the TCP port number on which application process 612 is listening for TCP connection requests.

Upon receiving the TCP connect request from application 630, transport layer 628 selects an unused TCP port number and associates the selected TCP port number with application 630. Transport layer 628 then broadcasts its use of the selected TCP port number to the other network interface cards 601(1) and 601(3) so that they may update their TCP port databases 690 and 692, respectively, to indicate that the selected TCP port number is being used by network interface card 601(2). Transport layer 628 then creates a TCP packet (also referred to as datagram), wherein the destination port number field contains the TCP port number associated with application 612 and the source port number field contains the TCP port number associated with application 630. The TCP packet is then passed to network layer 626.

Network layer 626 adds a network layer header to the TCP packet, thereby creating a network layer packet or datagram. The destination address field of the network layer header contains the network layer address of host 610, the source address field of the network layer header contains a network layer address of internetworking device 600, and the protocol field of the network layer header contains a value that indicates that the network layer packet is encapsulating the TCP protocol. Network layer 626 examines its network layer forwarding database 691 to determine to which network interface card 601(1) or 601(3) to transfer the network layer packet. The network layer packet is then transferred to network interface card 601(1) and ultimately placed onto network 602 and received by host 610.

Once a TCP connection is established between application 612 and application 630, application 612 can send data to and receive data from application 638 through application 630. As an example, if application 612 has data 680 to send to application 638, application 612 uses protocol stack 614 to place onto network 602 a data link layer packet 682 addressed to network interface card 601(1). Data link layer packet 682 encapsulates network layer packet 684, which encapsulates transport layer packet 683, which encapsulates data 680.

Data link layer packet 682 is received by physical layer 620. Physical layer 620, upon receiving data link layer packet 682, stores the packet 682 and notifies data link layer 622 that a data link layer packet has been received. Data link layer 622 then processes data link layer packet 682, and, if it determines that packet 682 is addressed to network interface card 601(1), data link layer 622 notifies network layer 624 that network layer packet 684 has been received.

Network layer 624 determines the destination address of network layer packet 684 by examining the contents of its destination address field. In this example, the destination address matches a network layer address of internetworking device 600 because the application process 612 is communicating with application 630. Consequently, network layer 624 next determines whether transport layer header 687 is a TCP header or a UDP header by examining a protocol field within network layer header 686. In this example, transport layer header 687 is a TCP header. Network layer 624 also determines the destination port number of transport layer header 687 by examining the destination port number field therein.

Because transport layer header 687 is a TCP header, network layer 624 uses TCP port database 690 to determine the network interface card to which the network layer packet should be forwarded based solely or in part on the destination port number contained in transport layer header 687. In this example, the destination port number is the TCP port number that transport layer 628 allocated to application 630.

Thus, network layer 624 passes network layer packet 684 to network layer 626 on network interface card 601(2).

Upon receiving network layer packet 684 from network layer 624, network layer 626 further processes network layer packet. Assuming no errors in network layer packet 684, network layer 626 transfers transport layer packet 683 encapsulated within network layer packet 684 to transport layer 628. In this example transport layer packet 683 is a TCP packet. Transport layer 628 processes TCP packet 683 according to the TCP protocol and passes data 680 to application process 630. Application process 630, in turn, sends data 680 to modem 632, which transmits data 680 through PSTN 605 to modem 634. Modem 634 then passes data 680 to application 638. The above example illustrates how two applications that run on different hosts can communicate with each other through internetworking device 600. It also illustrates the distributed processing architecture of internetworking device 600.

An additional feature of internetworking device 600 is that it can process fragmented network layer packets. There are situations where multiple data link layer frames are used to transmit a single network layer packet to its destination. In these situations, each data link layer frame encapsulates a fragment of the network layer packet. Each fragment shares a unique packet identifier so that the fragments can be reassembled by the destination host.

Figure 7A:
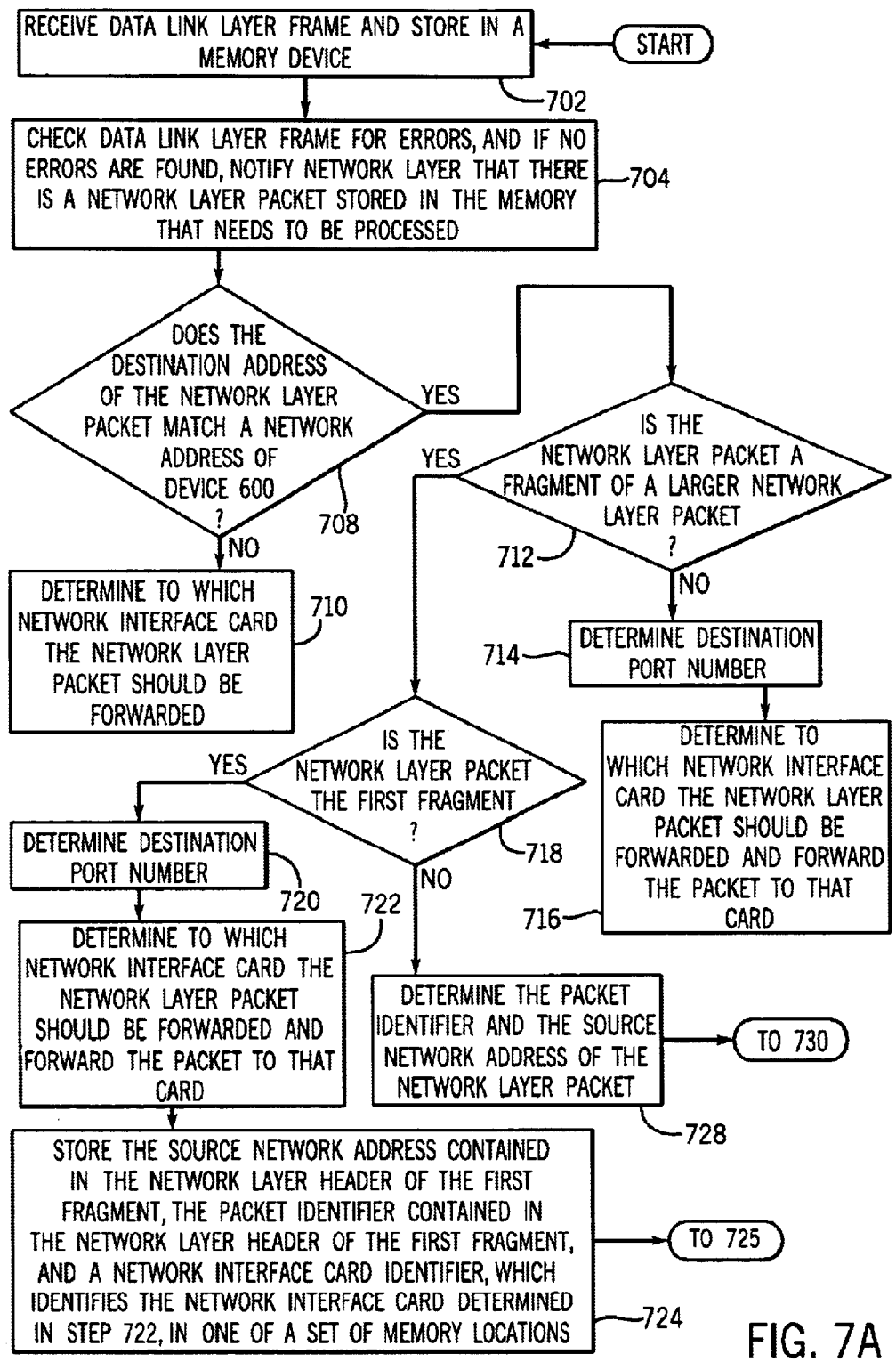
FIGS. 7A and 7B illustrates the process performed by a network interface card according tone embodiment when the network interface card receives a data link layer frame that encapsulates a fragment of a network layer packet.
Figure 7B:
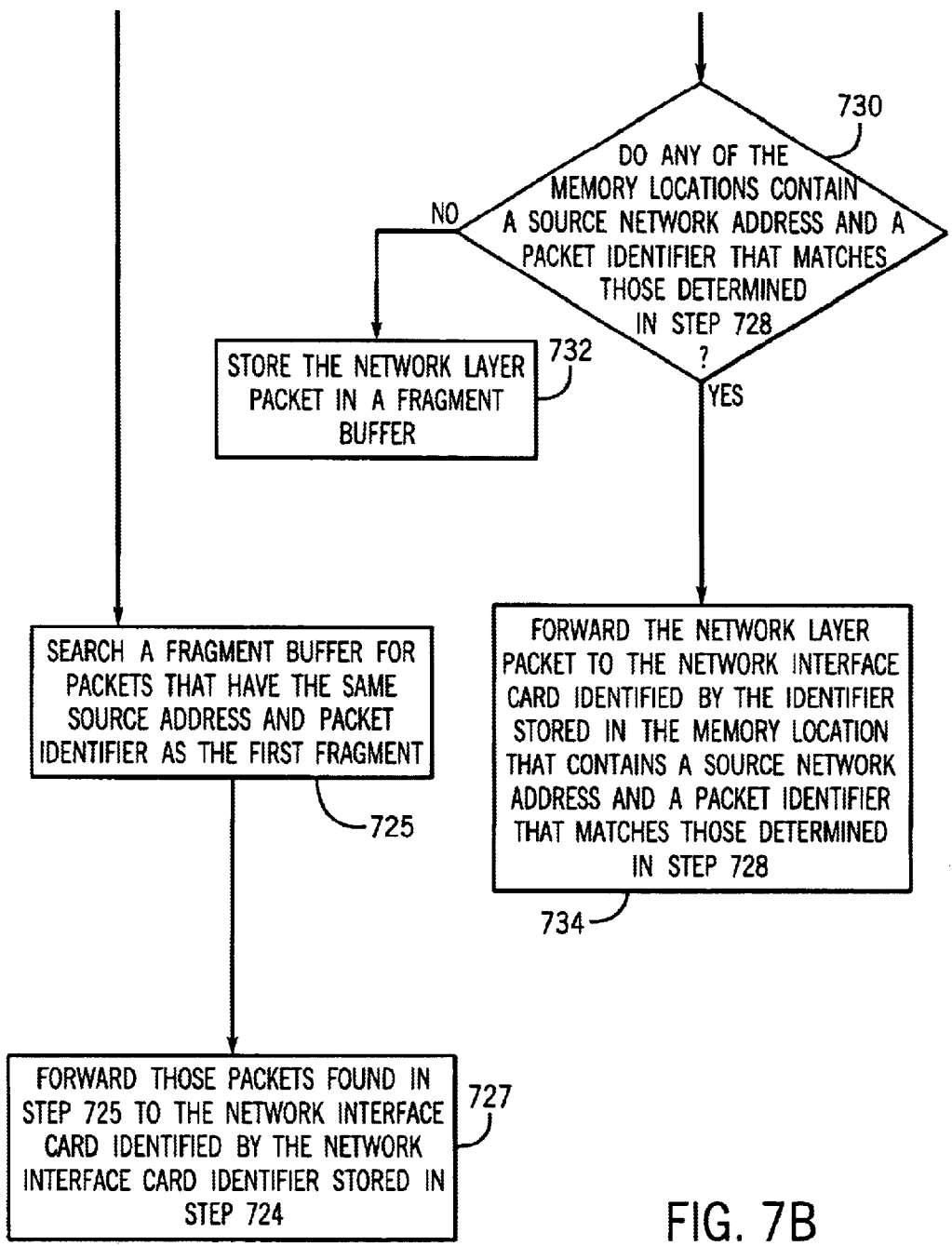

FIGS. 7A and 7B illustrates the process performed by exemplary network interface card 601(1) of device 600 when network interface card 601(1) receives a data link layer frame that encapsulates a fragment of a network layer packet. The process begins in step 702, where physical layer 620 receives a data link layer frame and stores it in a memory. In step 704, data link layer 622, among other things, checks the stored data link layer frame for errors, and if no errors are found, notifies network layer 624 that there is a network layer packet stored in the memory that needs to be processed. Control then passes to step 708.

Step 708 is a decisional step. In step 708, network layer 624 determines whether the destination address of the network layer packet matches a network layer address of device 600. If it doesn't, control passes to step 710, otherwise control passes to step 712. In step 710, network layer 624 determines the network interface card to which the network layer packet should be forwarded and forwards the network layer packet to that network interface card. In step 712, network layer 624 determines whether the network layer packet is fragment of a larger network layer packet. If it is not, control passes to step 714, otherwise control passes to step 718.

In step 714, network layer 624 determines the destination port number contained in the destination port field of the transport layer packet encapsulated by the network layer packet. Next (step 716), network layer 624 determines, based solely or in part on the destination port number determined in step 720, the network interface card to which the network layer packet should be forwarded and forwards the network layer packet to that network interface card.

In step 718, network layer 624 determines whether the network layer packet fragment is the first fragment. If it is the first fragment, control passes to step 720, otherwise control passes to step 726.

In step 720, network layer 624 determines the destination port number contained in the destination port field of the transport layer packet encapsulated by the network layer packet. Next (step 722), network layer 624 determines, based solely or in part on the destination port number determined in step 720, the network interface card to which the network layer packet should be forwarded and forwards the network layer packet to that network interface card. Next (step 724), network layer 624 stores the source network layer address contained in the network layer header of the first fragment, the packet identifier contained in the network layer header of the first fragment, and a network interface card identifier, which identifies the network interface card determined in step 722, in one of a set of memory locations. Next (step 725), network layer 624 searches a fragment buffer for fragments that have the same source network layer address and packet identifier as the first fragment. Next (step 727), those fragments are then forwarded to the network interface card identified by the network interface card identifier stored in step 724.

In step 728, network layer 624 determines the packet identifier of the fragmented packet and its source network layer address. Next (step 730), network layer 624 searches the set of memory locations to determine whether any of the memory locations contain a source network layer address and a packet identifier that matches those determined in step 728. If no match is found, control passes to step 732, otherwise control passes to step 734. In step 732, network layer 624 buffers the fragment in the fragment buffer. In step 734, network layer 624 forwards the fragment to the network interface card identified by the identifier stored in the memory location that contains a source network layer address and a packet identifier that matches those determined in step 728.

Another feature of the present invention is that it provides a means for two or more network interface cards to use the same transport layer port number. Typically, there is a one-to-one correspondence between transport layer port numbers and network interface cards. But in some applications, such as tunneling, two or more network interface cards may share the same transport layer port number.

Figure 8:
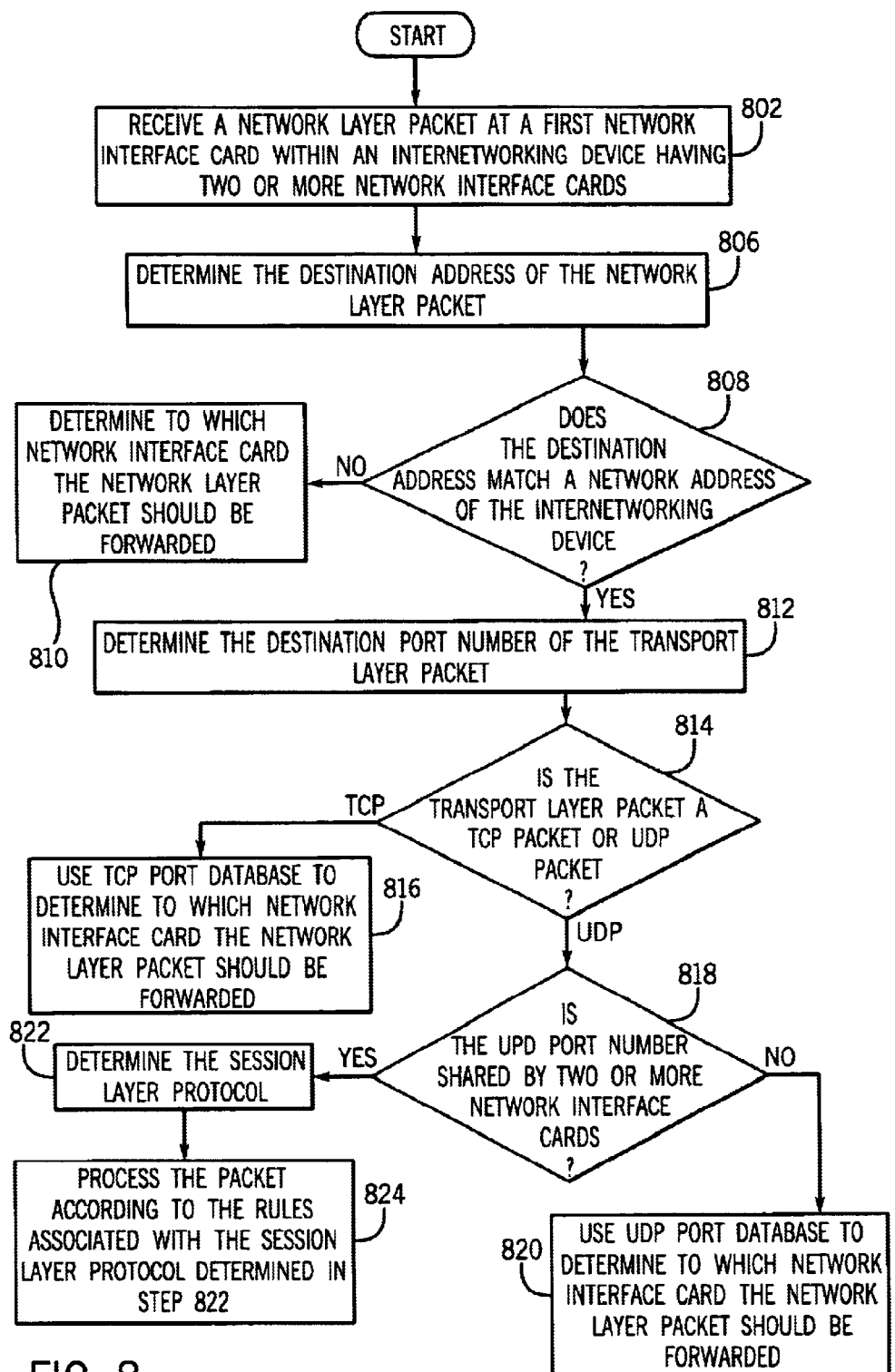
FIG. 8 illustrates a process according to one embodiment for allowing two or more network interface cards to share a transport layer port number.

FIG. 8 illustrates a procedure 800 according to one embodiment for allowing two or more network interface cards to share a single transport layer port number. In this one embodiment, the two or more network interface cards share a UDP port number. However, it should be readily apparent to one skilled in the art that other transport layer protocol port numbers (such as TCP port numbers) can be shared by two or more network interface cards.

Figure 9:
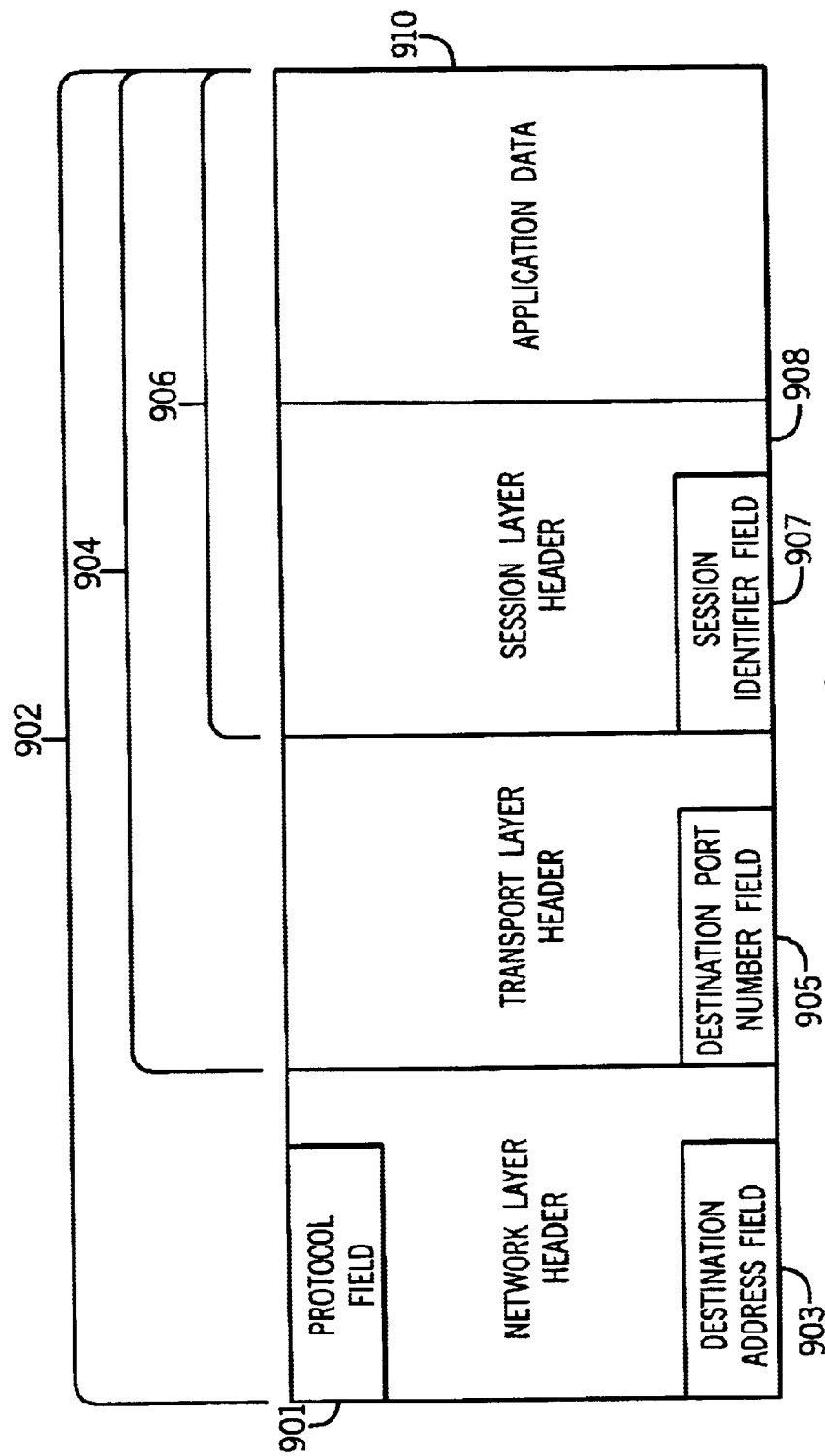
FIG. 9 illustrates a network layer packet.

Procedure 800 begins in step 802 where a network layer packet 902 (see FIG. 9) is received at a first network interface card within an internetworking device according to one embodiment. Network layer packet 902 encapsulates a transport layer packet 904, which encapsulates a session layer packet 906, which encapsulates application data 901.

A process on the first network interface card determines the destination address of network layer packet 902 by examining the contents of a destination address field 903 of packet 902 (step 806). Next, the process determines whether the destination address matches a network layer address of the internetworking device (step 808).

If the destination address does not match a network layer address of the internetworking device, the process examines a network layer forwarding database to determine the network interface card to which network layer packet 902 should be forwarded (step 810). But if the destination address matches a network layer address of the internetworking device, the process determines the destination port number of the transport layer packet encapsulated by network layer packet 902 by examining a destination port number field 905 within transport layer packet 904 (step 812).

Next, by examining a protocol field 901 within network layer packet 902, the process determines whether the transport layer packet encapsulated by network layer packet 902 is a TCP packet or a UDP packet (step 814). If transport layer packet 904 is a TCP packet, the process uses a TCP port database to determine the network interface card to which network layer packet 902 should be forwarded (step 816). Otherwise, the process determines whether the UDP port number determined in step 812 is shared by two or more network interface cards (step 818).

If the UDP port number is not shared by two or more network interface cards, the process uses a UDP port database to determine the network interface card to which network layer packet 902 should be forwarded (step 820). Otherwise, the process determines the session layer protocol encapsulated by transport layer packet 904 (step 822). After step 822, control passes to step 824. In step 824, the process processes the packet according to the rules associated with the session layer protocol determined in step 820.

For example, if the Layer Two Tunneling Protocol (L2TP) is determined in step 820 to be the session layer protocol, then the process determines whether session layer packet 906 is a control packet or a data packet. If session layer packet 906 is a control packet, network layer packet 902 is forwarded to a predetermined "manager" network interface card. Otherwise, the process determines the network interface card to which network layer packet 902 should be forwarded based on a session identifier stored in a session identifier field 907 of session layer header 908. More specifically, where the session layer protocol is the L2TP protocol, the process examines the first byte of the session identifier to determine the network interface card within the internetworking device to which network layer packet 902 should be forwarded.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An internetworking device comprising a plurality of network interface cards, each of said plurality of network interface cards being able to send data directly to any of the other network interface cards, wherein when one of said plurality of network interface cards receives a network layer packet that should be forwarded to another one of said plurality of network interface cards, a process running on said one of said plurality of network interface cards determines a destination address of said network layer packet and determines whether said destination address matches a network layer address of the internetworking device, wherein if said destination address does not match a network layer address of the internetworking device, said process further determines, based on said destination address, the network interface card to which said network layer packet should be forwarded, and wherein if said destination address matches a network layer address of the internetworking device, said process examines a destination port field within a transport layer packet encapsulated by said network layer packet to determine a destination port number and determines, based at least in part on said destination port number, the network interface card to which said network layer packet should be forwarded.

2. The internetworking device of claim 1, wherein said one of said plurality of network interface cards further comprises memory that stores a network layer forwarding database and a transport layer forwarding database, wherein said process has access to said network layer forwarding and transport layer forwarding databases and, when said destination address matches a network layer address of the internetworking device, said process utilizes said transport layer forwarding database in determining the network interface card to which said network layer packet should be forwarded.

3. The internetworking device of claim 2, wherein said memory stores a second transport layer forwarding database.

4. The internetworking device of claim 3, wherein the first transport layer forwarding database comprises a plurality of records having a port number field that stores a transmission control protocol (TCP) port number and a corresponding network interface card identifier field for storing a network interface card identifier.

5. The internetworking device of claim 4, wherein said second transport layer forwarding database comprises a plurality of records having a port number field for storing a user datagram protocol (UDP) port number and a corresponding network interface card identifier field for storing a network interface card identifier.

6. The internetworking device of claim 5, wherein if said destination address matches a network layer address of the internetworking device and said transport layer packet is a TCP packet, said process searches said first transport layer forwarding database for a record having a port number field that contains said destination port number.

7. The internetworking device of claim 6, wherein said process forwards said network layer packet to the network interface card identified by a network interface card identifier stored within a network interface card identifier field of said record having a port number field that contains said destination port number.

8. The internetworking device of claim 5, wherein if said destination address matches a network layer address of the internetworking device and said transport layer packet is a UDP packet, said process searches said second transport layer forwarding database for a record having a port number field that contains said destination port number.

9. A network interface card for an internetworking device, comprising:

a protocol stack comprising a physical layer, a data link layer, and a network layer;

a network layer packet forwarding database, comprising a plurality of records, each of said plurality of records storing at least a network layer address and a corresponding network interface card identifier; and a first transport layer packet forwarding database, comprising a plurality of records, each of said plurality of records storing at least a port number and a corresponding network interface card identifier, wherein when the network interface card is connected within the internetworking device and receives a network layer packet, which encapsulates a transport layer packet, said protocol stack determines a destination address of said network layer packet, and if said destination address does not match a network layer address of the internetworking device, said network layer searches said first network layer forwarding database for a record containing said destination address and forwards said network layer packet to the network interface card identified by a network interface card identifier stored in said record containing said destination address, and if said destination address matches a network layer address of the internetworking device, said network layer determines the destination port number of said transport layer packet, searches said first transport layer forwarding database for a record containing said destination port number, and forwards said network layer packet to the network interface card identified by a network interface card identifier stored in said record containing said destination port number.

10. The network interface card of claim 9, further comprising a second transport layer packet forwarding database, wherein said second transport layer packet forwarding database comprises a plurality of records, each of said plurality of records storing at least a port number and a corresponding network interface card identifier.

11. The network interface card of claim 10, wherein each port numbers stored in said records of the first transport layer forwarding database is transport control protocol (TCP) port numbers.

12. The network interface card of claim 11, wherein each port numbers stored in said records of said second transport layer forwarding database is user datagram protocol (UDP) port numbers.

13. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:

(a) determining a destination address of the network layer packet;

(b) if the destination address of the network layer packet does not match a network layer address of the internetworking device, then (1) determining, based on said destination address, the network interface card to which the network layer packet should be forwarded and (2) directly transmitting the network layer packet from the network interface card that received the network layer packet to the network interface card to which the network layer packet should be forwarded; and (c) if the destination address of the network layer packet matches a network layer address of the internetworking device, then (1) determining a destination port number of a transport layer packet encapsulated by the network layer packet, (2) determining, based at least in part on said destination port number, the network interface card to which the network layer packet should be forwarded, and (3) directly transmitting the network layer packet from the network interface card that received the network layer packet to the network interface card to which the network layer packet should be forwarded.

14. The method of claim 13, wherein step (c)(2), comprises the steps of searching a database having a plurality of records, each of said plurality of records having a port number field, for a record that contains said destination port number in said record's port number field.

15. The method of claim 13, further comprising the step of determining whether said transport layer packet conforms to one of a transmission control protocol (TCP) and a user datagram protocol (UDP).

16. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:

(a) determining a destination address of the network layer packet;

(b) if the destination address of the network layer packet does not match a network layer address of the internetworking device, then (1) determining, based on said destination address, the network interface card to which the network layer packet should be forwarded and (2) directly transmitting the network layer packet from the network interface card that received the network layer packet to the network interface card to which the network layer packet should be forwarded; and (c) if the destination address of the network layer packet matches a network layer address of the internetworking device, then:

(1) determining a destination port number of a transport layer packet encapsulated by the network layer packet;

(2) determining whether said destination port number is shared by two or more network interface cards; and (3) if said destination port number is not shared by two or more network interface cards, then determining, based at least in part on said destination port number, the network interface card to which the network layer packet should be forwarded and directly transmitting the network layer packet from the network interface card that received the network layer packet to the network interface card to which the network layer packet should be forwarded.

17. The method of claim 16, wherein if said destination port number is shared by two or more network interface cards, then the following steps are performed:

determining the protocol of a session layer packet encapsulated by said transport layer packet;

determining whether said session layer packet is a control packet or a data packet;

if said session layer packet is a control packet, then directly transmitting the network layer packet from the network interface card that received the network layer packet to a predetermined one of the plurality of network interface cards; and if said session layer packet is a data packet, then determining, based at least in part on a session identifier within said session layer packet, the network interface card to which the network layer packet should be forwarded and transmitting the network layer packet from the network interface card that received the network layer packet to the network interface card to which the network layer packet should be forwarded.

18. The method of claim 17, wherein said session identifier comprises two bytes of data, and wherein the step of determining, based at least in part on a session identifier within said session layer packet, the network interface card to which the network layer packet should be forwarded is based solely on said first byte of data.

19. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:

(a) determining a destination address of the network layer packet;
(b) if the destination address of the network layer packet does not match a network layer address of the internetworking device, then
  (1) determining, based on said destination address, the network interface card to which the network layer packet should be forwarded and
  (2) transmitting the network layer packet from the network interface card that received the network layer packet to the network interface card to which the network layer packet should be forwarded; and
(c) if the destination address of the network layer packet matches a network layer address of the internetworking device, then:
  (1) determining whether the network layer packet is a fragment of a larger network layer packet; and
  (2) if the network layer packet is not a fragment of a larger network layer packet, then determining a destination port number of a transport layer packet encapsulated by the network layer packet, determining, based at least in part on said destination port number, the network interface card to which the network layer packet should be forwarded, and transmitting the network layer packet from the network interface card that received the network layer packet to the network interface card to which the network layer packet should be forwarded.

20. The method of claim 19, wherein if the network layer packet is a fragment of said larger network layer packet and the network layer packet is the first in a series of fragments of said larger network layer packet, then:
  determining a destination port number of said transport layer packet;
  determining, based at least in part on said destination port number, the network interface card to which the network layer packet should be forwarded, transmitting the network layer packet from the network interface card that received the network layer packet to the network interface card to which the network layer packet should be forwarded; determining a packet identifier of the network layer packet;
  storing in one of a set of memory locations a source network layer address of the network layer packet, said packet identifier, and a network interface card identifier, wherein said network interface card identifier identifies the network interface card to which the network layer packet should be forwarded; and
  searching a fragment buffer for network layer packets that have the same source address and packet identifier as the network layer packet and transmitting those packets to the network interface card identified by said network interface card identifier.

21. The method of claim 20, wherein if the network layer packet is a fragment but is not the first fragment, then:
  determining a packet identifier and a source address of the network layer packet;
  searching said set of memory locations for a memory location that contains a packet identifier and a source address that matches said packet identifier and said source address of the network layer packet; and
  if such a memory location is found, then transmitting the network layer packet to the network interface card identified by the network interface card identifier stored in said memory location, otherwise storing the network layer packet in said fragment buffer.

22. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:
  (a) receiving a data link layer frame at a first one of the plurality of network interface cards, wherein said data link layer frame encapsulates the network layer packet, wherein the network layer packet encapsulates a transport layer packet comprising a header portion and a data portion, wherein said header portion includes a destination port number, said destination port number being associated with one of the plurality of network interface cards;
  (b) determining a destination address of the network layer packet;
  (c) determining whether said destination address matches a network layer address of the internetworking device; and
  (d) if said destination address matches said network layer address of the internetworking device, (1) determining said destination port number, (2) determining which one of the plurality of network interface cards is associated with said destination port number, and (3) transmitting the network layer packet from the network interface card that received the network layer packet to said network interface card that is associated with said destination port number.

23. The method of claim 22, further comprising the step of examining a packet forwarding database to determine to which one of the plurality of network interface cards the network layer packet should be forwarded if said destination address does not match said network layer address of the internetworking device.

24. The method of claim 22, wherein (d)(2) comprises the step of examining a transport layer packet forwarding database.

25. The method of claim 22, further comprising the step of determining a transport layer protocol indicated by the contents of a protocol field within the network layer packet.

26. The method of claim 25, wherein said transport layer protocol is one of a transmission control protocol (TCP) and a user datagram protocol (UDP).

27. The method of claim 22, further comprising the step of determining whether the network interface card determined in step (d)(2) is said first one of the plurality of network interface cards.

28. The method of claim 27, further comprising the step of transmitting the network layer packet to said network interface card that is associated with said destination port number only if the network interface card determined in step (d)(2) is not said first one of the plurality of network interface cards.

29. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:
  (a) determining a destination address of the network layer packet; and (b) if the destination address of the network layer packet matches a network layer address of the internetworking device, then:
  (1) determining a destination port number of a transport layer packet encapsulated by the network layer packet;
  (2) determining whether said destination port number is shared by two or more network interface cards; and
  (3) if said destination port number is not shared by two or more network interface cards, then determining, based at least in part on said destination port number, the network interface card to which the network layer packet should be forwarded and directly transmitting the network layer packet from the network interface card that received the network layer packet to the network interface card to which the network layer packet should be forwarded.

30. A method for routing a network layer packet within an internetworking device having a plurality of network interface cards, each of the plurality of network interface cards being able to transmit packets directly to any of the other network interface cards within the internetworking device, wherein the network layer packet is received at one of the plurality of network interface cards and should be forwarded to another one of the plurality of network interface cards, comprising the steps of:
  (a) determining a destination address of the network layer packet; and
  (b) if the destination address of the network layer packet matches a network layer address of the internetworking device, then:
    (1) determining whether the network layer packet is a fragment of a larger network layer packet; and
    (2) if the network layer packet is not a fragment of a larger network layer packet, then determining a destination port number of a transport layer packet encapsulated by the network layer packet, determining, based at least in part on said destination port number, the network interface card to which the network layer packet should be forwarded, and transmitting the network layer packet from the network interface card that received the network layer packet to the network interface card to which the network layer packet should be forwarded.

* * * * *